(12) United States Patent
Suzuki et al.

(10) Patent No.: US 6,824,490 B2
(45) Date of Patent: Nov. 30, 2004

(54) PLANETARY GEAR REDUCTION DEVICE WITH TORQUE LIMITER FUNCTION

(75) Inventors: Yuzuru Suzuki, Shizuoka-ken (JP); Kunitake Matsushita, Shizuoka-ken (JP); Kazuo Muramatsu, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/669,218

(22) Filed: Sep. 24, 2003

(65) Prior Publication Data

US 2004/0058777 A1 Mar. 25, 2004

Related U.S. Application Data

(62) Division of application No. 09/997,793, filed on Nov. 29, 2001, now Pat. No. 6,682,454.

(30) Foreign Application Priority Data

Dec. 4, 2000 (JP) ........................................ 2000-368254

(51) Int. Cl.[7] ............................ F16H 3/74; F16D 23/00
(52) U.S. Cl. ...................................... 475/263; 192/56.6
(58) Field of Search .............................. 475/257, 263, 475/342; 74/412 TA; 464/39; 192/56.56, 56.61

(56) References Cited

U.S. PATENT DOCUMENTS

| | | | | |
|---|---|---|---|---|
| 4,528,470 A | * | 7/1985 | Young et al. | 310/78 |
| 5,713,813 A | * | 2/1998 | von Greyerz | 475/257 |
| 6,099,433 A | * | 8/2000 | Brouwer | 475/342 |

* cited by examiner

*Primary Examiner*—Roger Pang
(74) *Attorney, Agent, or Firm*—Fay, Sharpe, Fagan, Minnich & McKee, LLP

(57) ABSTRACT

A planetary gear reduction device with a torque limiter function includes a housing, an input shaft rotatably supported by one end of the housing and connected to a power source so as to input a torque from the power source, an output shaft rotatably supported by the other end of the housing so as to output the torque from the power source, a reduction gear train provided between the input shaft and the output shaft and constituted of a plurality of gears meshing with one another, and a torque limiting mechanism mounted in the reduction gear train. In this device, when an excessive torque is generated in the output shaft, torque transmission from the input shaft to the output shaft is disconnected by the action of the torque limiting mechanism.

7 Claims, 4 Drawing Sheets

PLANETARY GEAR REDUCTION DEVICE WITH TORQUE LIMITER FUNCTION

This application is a division of application Ser. No. 09/997,793, filed Nov. 29, 2001 now U.S. Pat. No. 6,682,454.

BACKGROUND OF THE INVENTION

1. Field of the Invention

The present invention relates to a simple-structured, compact planetary gear reduction device with a torque limiter function.

2. Description of the Prior Art

As a reduction device for reducing a rotation speed of a motor or the like, a planetary gear reduction device is generally known conventionally. The planetary gear reduction device can obtain a large reduction ratio and can be made compact, so it works effectively for various types of apparatuses to which it is attached.

FIGS. 1A and 1B are a plan view and a partially cutaway side view, respectively, showing the structure of one of conventional planetary gear reduction devices.

In this conventional planetary gear reduction device, as shown in FIGS. 1A and 1B, a stationary ring gear 46 is fixedly attached to a lower portion of a housing 43, and a motor 45 is mounted to a lower portion of the ring gear 46.

A sun gear 44 is fixedly mounted to a motor output shaft 45a rotatably supported at the center of the lower portion of the housing 43 and serving as an input shaft of the planetary gear reduction device. A planetary gear 47 meshes with the sun gear 44 through respective teeth formed on their respective outer circumferential surfaces, and meshes with the ring gear 46 through teeth formed on an inner circumferential surface of the ring gear 46. The planetary gear 47 is coaxially, integrally overlaid with another planetary gear 48. Three planetary gear pairs each constituted by the planetary gear 47 and the planetary gear 48 and rotatably attached to a carrier 51 and a carrier 52 provided on their lower and upper sides, respectively, are disposed around the sun gear 44. FIG. 1B shows one of the three planetary gear pairs.

An output shaft 41 is rotatably mounted at the center of an upper portion of the housing 43 through a stop ring 42 such that an axially down movement of the output shaft 41 is stopped. A flange gear 49 is fixed to the output shaft 41 in a press fit manner, and inner teeth 49a formed on the lower portion of the inner circumferential surface of the flange gear 49 mesh with teeth 48a formed on an outer circumferential surface of the planetary gear 48 (although not shown, the flange gear 49 meshes similarly with two other planetary gears 48 at different positions).

In the conventional planetary gear reduction device, when the motor 45 is driven to rotate the motor output shaft 45a, the sun gear 44 and then the planetary gear 47 are rotated. As the planetary gear 47 meshes with the ring gear 46 which is stationary, it moves around the sun gear 44 while rotating. As a result, the flange gear 49 is rotated through the planetary gear 48. Rotation speed of the motor output shaft 45a is reduced to that of the output shaft 41 in this manner.

The conventional planetary gear reduction device has the following problems.

When, for some reasons, an overload acts on an apparatus in which the planetary gear reduction device is equipped, power transmission must be disconnected to protect the motor and the planetary gear reduction device themselves. Also, when an overload acts on the apparatus due to, e.g., a human body touching with the apparatus, power transmission must be disconnected to assure safety.

However, the planetary gear reduction device according to the prior art does not have a torque limiter function. Therefore, a torque limiting mechanism for disconnecting power transmission depending on the frictional state of a clutch disk must be added to the output shaft of the planetary gear reduction device, which inevitably makes the structure become large. Even when a reduction device formed by combining gear trains without using a planetary gear reduction device is adopted and a torque limiting mechanism is mounted in it, the structure is complicated, thereby inevitably becoming large also.

SUMMARY OF THE INVENTION

The present invention has been made in consideration of the above circumstances in the prior art, and has as its object to provide a simple-structured, compact planetary gear reduction device with a built-in torque limiting mechanism, which can reliably disconnect power transmission when an overload acts on it.

In order to achieve the above object, according to the first aspect of the present invention, a planetary gear reduction device with a torque limiter function, comprises: a housing; an input shaft commonly served by an output shaft of a power source, rotatably supported by one of end of the housing, located at a radially central and axially lower portion of the housing and adapted to take in a torque from the power source; an output shaft rotatably supported by the other end of the housing, located at a radially central and axially upper portion of the housing adapted to take out the torque transmitted from the power source; a reduction gear train provided between the input shaft and the output shaft and comprising a plurality of gears meshing with one another; and a built-in torque limiting mechanism constituted in said reduction gear train, whereby when an excessive torque is generated in the output shaft, torque transmission from the input shaft to the output shaft is disconnected by an action of said torque limiting mechanism.

According to the second aspect of the present invention, the torque limiting mechanism of the first aspect comprises: a planetary bevel gear which is one gear of the reduction gear train; a flange gear mounted to the output shaft freely in an axial direction and fixedly in a circumferential direction and meshing with the planetary bevel gear through inner teeth formed on a bevelled lower end surface thereof; a compression means provided between an upper surface of the flange gear and a lower surface or an upper lid of the housing and adapted to constantly press the flange gear toward the planetary bevel gear, whereby when an excessive torque is generated in the output shaft, the planetary bevel gear and the flange gear are disengaged from each other by a reaction force generated between respective teeth of those gears meshing with each other so as to disconnect torque transmission from the input shaft to the output shaft.

According to the third aspect of the present invention, the torque limiting mechanism of the first aspect comprises: a flange gear mounted to the output shaft fixedly in an axial direction and freely in a circumferential direction; an internal gear formed on an upper surface of the flange gear; a declutch gear mounted to the output shaft freely in the axial direction and fixedly in the circumferential direction and adapted to mesh with the internal gear; and a compression means provided between an upper surface of the declutch gear and a lower surface of an upper lid of the housing and adapted to constantly press the declutch gear toward the internal gear, whereby when an excessive torque is generated in the output shaft, the declutch gear and the internal gear are disengaged from each other by a reaction force generated between respective teeth of those gears meshing with each other so as to disconnect torque transmission from the input shaft to the output shaft.

According to the fourth aspect of the present invention, the torque limiting mechanism of the first aspect comprises: a flange gear mounted to the output shaft fixedly in an axial direction and freely in a circumferential direction; a friction surface portion formed on an upper surface of the flange gear; a clutch disk mounted to the output shaft freely in the axial direction and fixedly in the circumferential direction and adapted to come in frictional contact with the friction surface portion; and a compression means provided between an upper surface of the clutch disk and a lower surface of an upper lid of the housing and adapted to constantly press the clutch disk toward the friction surface portion, whereby when an excessive torque is generated in the output shaft, the clutch disk and the friction surface portion are disengaged from each other by a reaction force generated therebetween so as to disconnect torque transmission from the input shaft to the output shaft.

In order to achieve the above object, according to the fifth aspect of the present invention, a planetary gear reduction device with a torque limiter function comprises: a sun gear fixedly mounted to an input shaft rotatably supported and located at a radially central and axially lower portion of a housing; a planetary gear meshing with the sun gear through respective teeth formed on their respective outer circumferential surfaces; a stationary ring gear having inner teeth on an inner circumferential surface thereof and meshing with the planetary gear through the inner teeth thereof; a planetary bevel gear coaxially and integrally mounted on the planetary gear to constitute a planetary gear pair; an output shaft rotatably supported and located at a radially central and axially upper portion of the housing; a flange gear mounted to the output shaft freely in an axial direction and fixedly in a circumferential direction and meshing with the planetary bevel gear through inner teeth formed on a bevelled lower end surface thereof; and means provided between an upper surface of the flange gear and a lower surface of an upper lid of the housing and adapted to constantly press the flange gear toward the planetary bevel gear, whereby when an excessive torque is generated in the output shaft, the flange gear and the planetary bevel gear are disengaged from each other by a reaction force generated between respective teeth of those gears meshing with each other so as to disconnect torque transmission therebetween.

In order to achieve the above object, according to the seventh aspect of the present invention, a planetary gear reduction device with a torque limiter function comprises: a sun gear fixedly mounted to an input shaft rotatably supported and located at a radially central and axially lower portion of a housing; a first planetary gear meshing with the sun gear through respective teeth formed on their respective outer circumferential surfaces; a stationary ring gear having inner teeth on an inner circumferential surface thereof and meshing with the first planetary gear through the inner teeth thereof; a second planetary gear coaxially and integrally mounted on the first planetary gear to constitute a planetary gear pair; an output shaft rotatably supported and located at a radially central and axially upper portion of the housing; a flange gear mounted to the output shaft fixedly in an axial direction and freely in a circumferential direction and meshing with the second planetary gear through inner teeth formed on a lower portion of an inner circumferential surface thereof; an internal gear formed on an upper surface of the flange gear; a declutch gear attached to the output shaft freely in the axial direction and fixedly in the circumferential direction and adapted to mesh with the internal gear; and means provided between an upper surface of the declutch gear and a lower surface of an upper lid of the housing and adapted to constantly press the declutch gear toward the internal gear, whereby when an excessive torque is generated in the output shaft, the declutch gear and the internal gear are disengaged from each other by a reaction force generated between respective teeth of those gears meshing with each other so as to disconnect torque transmission therebetween.

In order to achieve the above object, according to the eighth aspect of the present invention, a planetary gear reduction device with a torque limiter function comprises: a sun gear fixedly mounted to an input shaft rotatably supported and located at a radially central and axially lower portion of a housing; a first planetary gear meshing with the sun gear through respective teeth formed on their respective outer circumferential surfaces; a stationary ring gear having inner teeth on an inner circumferential surface thereof and meshing with the first planetary gear through the inner teeth thereof; a second planetary gear coaxially and integrally mounted on the first planetary gear to constitute a planetary gear pair; an output shaft rotatably supported and located at a radially central and axially upper portion of the housing; a flange gear mounted to the output shaft fixedly in an axial direction and freely in a circumferential direction and meshing with the second planetary gear through inner teeth formed on a lower portion of an inner circumferential surface thereof; a friction surface portion formed on an upper surface of the flange gear; a clutch disk attached to the output shaft freely in the axial direction and fixedly in the circumferential direction and adapted to come into frictional contact with the friction surface portion; and means provided between an upper surface of the clutch disk and a lower surface of an upper lid of the housing and adapted to constantly press the clutch disk toward the friction surface portion, whereby when an excessive torque is generated in the output shaft, the clutch disk and the friction surface portion that are normally in frictional contact with each other are disengaged from each other by a reaction force generated therebetween so as to disconnect torque transmission therebetween.

The above aspects have the following subsidiary aspects.

The sun gear, the planetary gear or the first planetary gear, and the ring gear are helical gears.

The compression means is a conical compression spring.

A plurality of planetary gear pairs are provided along an inner circumferential surface of the ring gear.

As is apparent from the above aspects, since the planetary gear reduction device with the torque limiter function according to the present invention includes a torque limiting mechanism which can be formed by the combination of the planetary bevel gear, the flange gear, and the compression spring in the first aspect, the combination of the internal gear formed on the upper surface of the flange gear, the declutch gear, and the compression spring in the second aspect, or the combination of the friction surface formed on the upper surface of the flange gear, the clutch disk, and the compression spring in the third aspect, it can be made simple in structure and compact, and can obtain a large reduction ratio while assuring safety.

Since the sun gear, the planetary gear or the first planetary gear, and the ring gear are helical gears, the torque can be transmitted smoothly, and noise as the disadvantage of the planetary gear reduction device can be decreased.

Since the compression spring is a conical compression spring, it can press the flange gear, the declutch gear, or the clutch disk with a minimum thickness in a well-balance manner.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF PREFERRED EMBODIMENTS

Several preferred embodiments of the present invention will be described in detail with reference to the accompanying drawings.

A planetary gear reduction device with a torque limiter function of the present invention includes a housing, an input shaft commonly served by an output shaft of a power source rotatably supported and located at a radially central and axially lower portion of the housing and connected to a power source such as, for example, a motor, etc., so as to take in a torque from the power source, an output shaft rotatably supported by the other end of the housing and adapted to take out the torque transmitted from the power source, a reduction gear train provided between the input shaft and the output shaft and comprised of a plurality of gears such as a sun gear, planetary gears, ring gear, flange gear, etc., which mesh with one another, and a built-in torque limiting mechanism constituted in the reduction gear train. In this device, when an excessive torque is generated in the output shaft, torque transmission from the input shaft to the output shaft is disconnected by the action of the torque limiting mechanism.

Figure 1A:
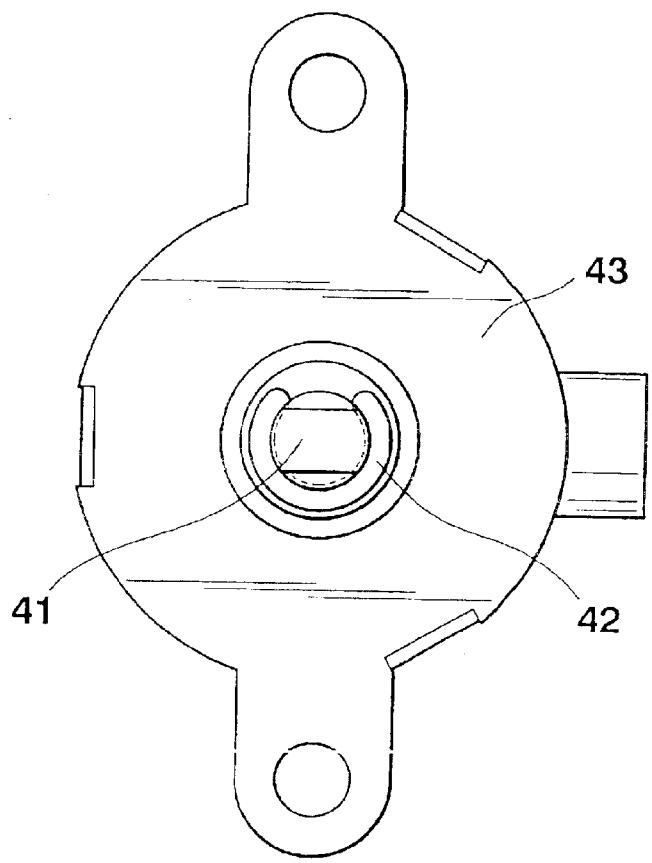
FIGS. 1A and 1B are a plan view and a partially cutaway side view, respectively, showing the structure of a planetary gear reduction device according to the prior art.
Figure 1B:
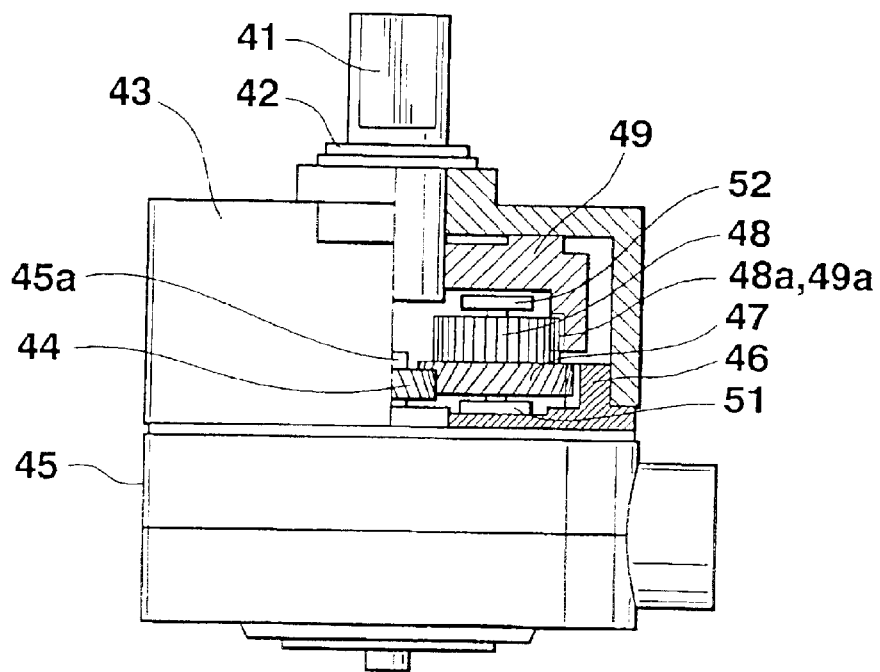
Figure 2A:
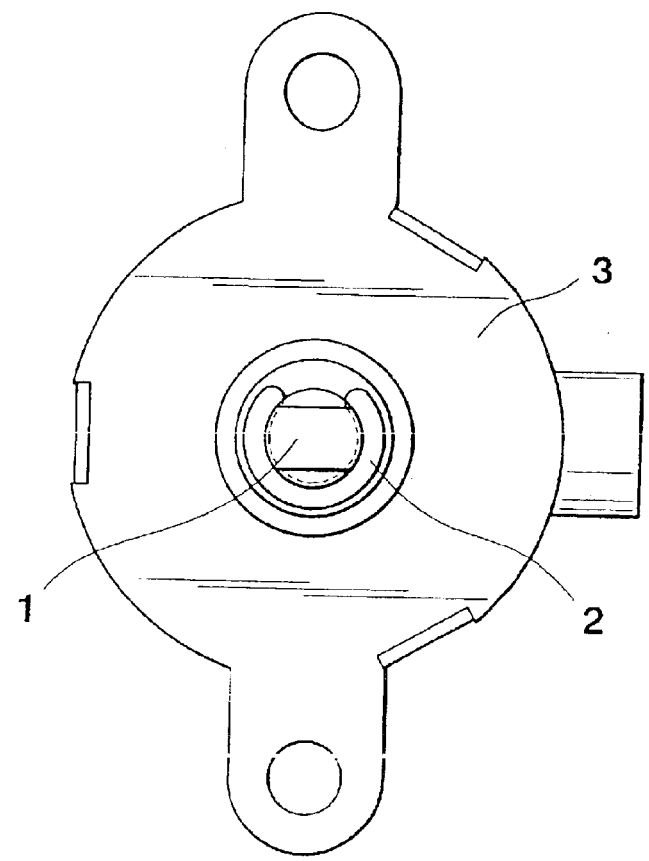
FIGS. 2A and 2B are a plan view and a partially cutaway side view, respectively, showing the structure of a planetary gear reduction device with a torque limiter function according to the first embodiment of the present invention.
Figure 2B:
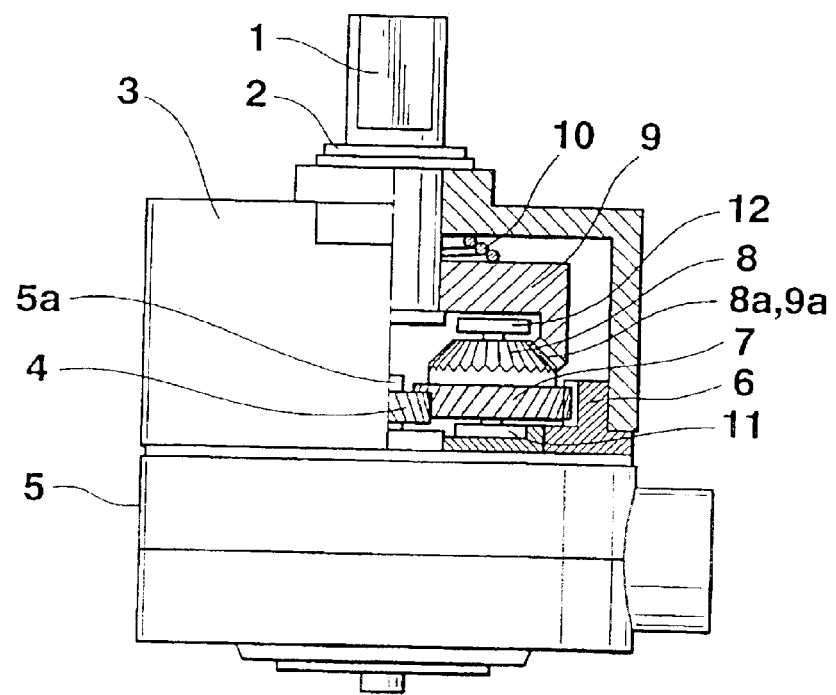

FIGS. 2A and 2B are a plan view and a partially cutaway side view, respectively, showing the structure of a planetary gear reduction device with a torque limiter function according to the first embodiment of the present invention.

As shown in FIGS. 2A and 2B, in the planetary gear reduction device with the torque limiter function according to the first embodiment, a stationary ring gear 6 is fixedly attached to a lower portion of a housing 3, and a motor 5 is mounted on a lower side of the ring gear 6.

A sun gear 4 is fixedly mounted to an output shaft 5a of the motor 5 which is rotatably supported by the housing 3 and located at a radially central and axially lower portion of the housing 3. The motor output shaft 5a serves as an input shaft of the planetary gear reduction device with the torque limiter function. A planetary gear 7 meshes with the sun gear 4 through respective teeth formed on their respective outer circumferential surfaces, and with the ring gear 6 through inner teeth formed on an inner circumferential surface of the ring gear 6. The planetary gear 7 is coaxially, integrally overlaid with a planetary bevel gear 8. A plurality of planetary gear pairs, each of which is integrally constituted by the planetary gear 7 and the planetary bevel gear 8 and rotatably attached through an attaching shaft to a carrier 11 provided under the planetary gear 7 and a carrier 12 provided above the planetary bevel gear 8, are provided around the sun gear 4. FIG. 2B shows one planetary gear pair.

An output shaft 1 is rotatably supported by the housing 3, axially fixed by means of a stop ring 2 mounted to the housing 3, and located at a radially central and axially upper portion of the housing 3. A flange gear 9 is mounted to the output shaft 1 freely in the axial direction and fixedly in the circumferential direction and meshes with the planetary bevel gear 8 such that inner teeth 9a formed on a bevelled lower end surface of the flange gear 9 engage with teeth 8a formed on an outer surface of the planetary bevel gear 8 (although not shown, the flange gear 9 similarly meshes with other planetary bevel gears 8 at different positions).

A portion of the output shaft 1, to which the flange gear 9 is attached, is processed with a D-cut or a spline, so the flange gear 9 can freely move in the axial direction while it is immovable in the rotational direction.

A compression spring 10 for constantly pressing the flange gear 9 toward the planetary bevel gear 8 is interposed between an upper surface of the flange gear 9 and a lower surface of an upper lid of the housing 3. If the compression spring 10 is a conical spring, it can press the flange gear 9 with a good balance and can decrease the compression height, thus enabling downsizing.

The operation of the first embodiment will be described.

In the planetary gear reduction device with the torque limiter function according to the first embodiment, when the motor 5 is driven to rotate the motor output shaft 5a, the sun gear 4 rotates, thereby rotating the planetary gear 7. Since the planetary gear 7 meshes with the stationary ring gear 6, it moves around the sun gear 4 while rotating, thereby rotating the flange gear 9 through the planetary bevel gear 8. Rotation speed of the motor output shaft 5a (the input shaft of the device) is reduced to that of the output shaft 1 in this manner.

The planetary gear reduction device with the torque limiter function reduces the rotation speed of the motor 5. When an excessive torque is generated in the output shaft 1, a reaction force generated between the teeth 8a of the planetary bevel gear 8 and the inner teeth 9a of the flange gear 9 increases. Thus, the flange gear 9 moves upward against the pressing force of the compression spring 10 to disengage from the planetary bevel gear 8. Hence, torque transmission is disconnected between the flange gear 9 and the planetary bevel gear 8.

As described above, the planetary gear reduction device with the torque limiter function according to the first embodiment can have a built-in torque limiting mechanism constituted of the planetary bevel gear 8, the flange gear 9, and the compression spring 10, so that it can be made simple in structure and compact while obtaining a large reduction ratio and assuring safety.

In the planetary gear reduction device with the torque limiter function according to the first embodiment, when the sun gear 4, the planetary gear 7, and the ring gear 6 are helical gears, the torque can be transmitted smoothly, and noise as the disadvantage of the planetary gear reduction device can be decreased.

Figure 3A:
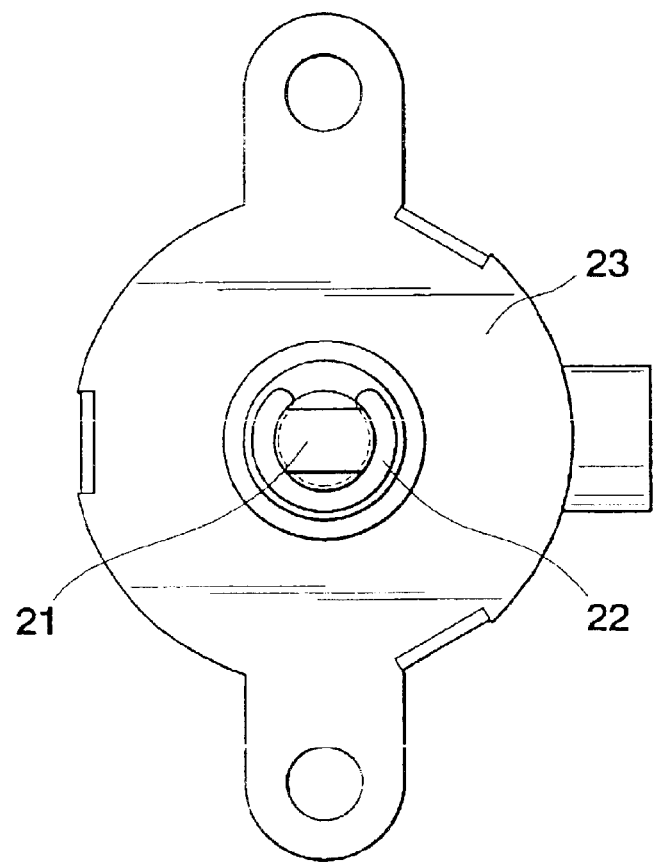
FIGS. 3A and 3B are a plan view and a partially cutaway side view, respectively, showing the structure of a planetary gear reduction device with a torque limiter function according to the second embodiment of the present invention.
Figure 3B:
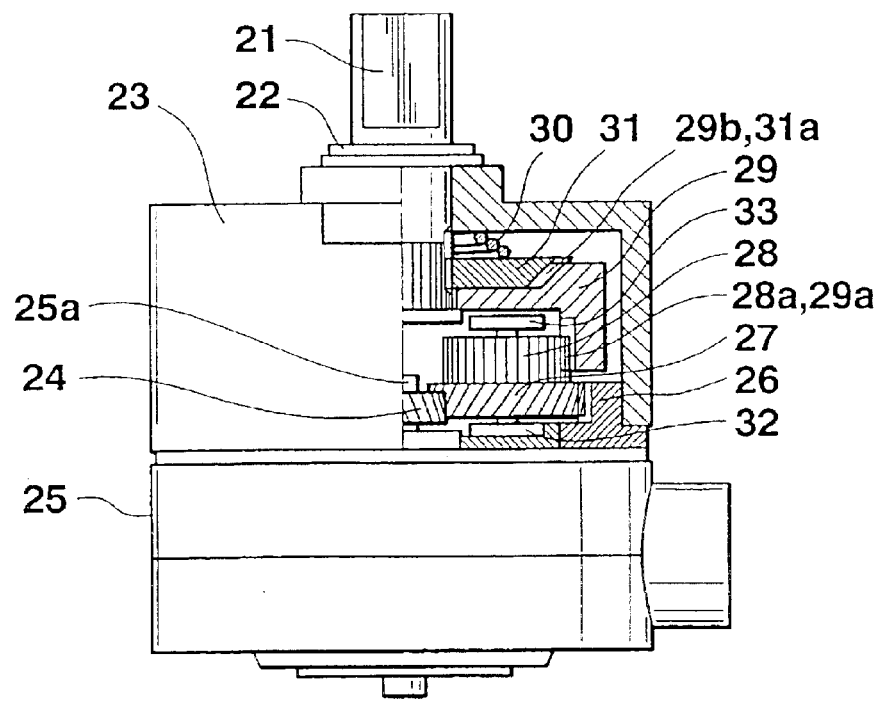

FIGS. 3A and 3B are a plan view and a partially cutaway side view, respectively, showing the structure of a planetary gear reduction device with a torque limiter function according to the second embodiment of the present invention.

In the planetary gear reduction device with the torque limiter function according to the second embodiment, as shown in FIGS. 3A and 3B, a stationary ring gear 26 is fixedly attached to a lower portion of a housing 23, and a motor 25 is mounted on a lower side of the ring gear 26.

A sun gear 24 is fixedly mounted to an output shaft 25a of the motor 25 which is rotatably supported by the housing 23 and located at a radially central and axially lower portion of the housing 23. The motor output shaft 25a serves as an input shaft of the planetary gear reduction device with the torque limiter function. A first planetary gear 27 meshes with the sun gear 24 through respective teeth formed on their respective outer surfaces, and meshes with the ring gear 26 through inner teeth formed on an inner circumferential surface of the ring gear 26. The first planetary gear 27 is coaxially, integrally overlaid with a second planetary gear 28. A plurality of planetary gear pairs, each of which is integrally constituted by the first and second planetary gears 27 and 28 and rotatably mounted through a mounting shaft to a carrier 32 provided under the first planetary gear 27 and a carrier 33 provided above the second planetary gear 28, are provided around the sun gear 24. FIG. 3B shows one planetary gear pair.

An output shaft 21 is rotatably supported by the housing 23, axially fixed by means of a stop ring 22 mounted to the housing 23, and located at a radially central and axially upper portion of the housing 23. A flange gear 29 is mounted to the output shaft 21 fixedly in the axial direction and freely in the circumferential direction and meshes with the second planetary gear 28 such that inner teeth 29a formed on a lower inner circumferential surface of the flange gear 29 engage with teeth 28a formed on an outer circumferential surface of the second planetary gear 28 (although not shown, the flange gear 29 similarly meshes with other planetary gears 28 at different positions).

A declutch gear 31 mounted to the output shaft 21 freely in the axial direction and fixedly in the rotational direction is provided on an upper surface of the flange gear 29. Bevel teeth 31a formed on an outer circumferential surface of the declutch gear 31 mesh with bevel teeth 29b formed on the upper surface of the flange gear 29.

A compression spring 30 for constantly pressing the declutch gear 31 toward the flange gear 29 is interposed between an upper surface of the declutch gear 31 and a lower surface of an upper lid of the housing 23. If the compression spring 30 is a conical spring in the same manner as the compression spring 10 of the first embodiment, it can press the declutch gear 31 with a good balance and can reduce the dimension simultaneously.

The operation of the second embodiment will be described.

In the planetary gear reduction device with the torque limiter function according to the second embodiment, when the motor 25 is driven to rotate the motor output shaft 25a, the sun gear 24 and the first planetary gear 27 are rotated. Since the first planetary gear 27 meshes with the ring gear 26 which is stationary, it moves around the sun gear 24 while rotating, thereby rotating the flange gear 29 through the second planetary gear 28. Successively, the flange gear 29 meshes with the declutch gear 31, so rotation speed of the motor output shaft 25a is reduced to that of the output shaft 21.

While the planetary gear reduction device with the torque limiter function reduces the rotation speed of the motor 25, it performs a torque limitter function in the following manner. When an excessive torque is generated in the output shaft 21, a reaction force generated between the bevel teeth 29b formed on the upper surface of the flange gear 29 and the bevel teeth 31a of the declutch gear 31 increases, whereby the declutch gear 31 moves upward against the pressing force of the compression spring 30 to disengage from the flange gear 29 disconnecting torque transmission between the declutch gear 31 and the flange gear 29.

As described above, since the planetary gear reduction device with the torque limiter function according to the second embodiment can effect the torque limiter function by means of the bevel teeth 29b formed on the flange gear 29, the declutch gear 31, and the compression spring 30, it can be made simple in structure and compact while obtaining a large reduction ratio and assuring safety.

In the planetary gear reduction device with the torque limiter function according to the second embodiment, if the sun gear 24, the first planetary gear 27, and the ring gear 26 are helical gears, the torque can be transmitted smoothly, and noise as the disadvantage of the planetary gear reduction device can be decreased.

Figure 4:
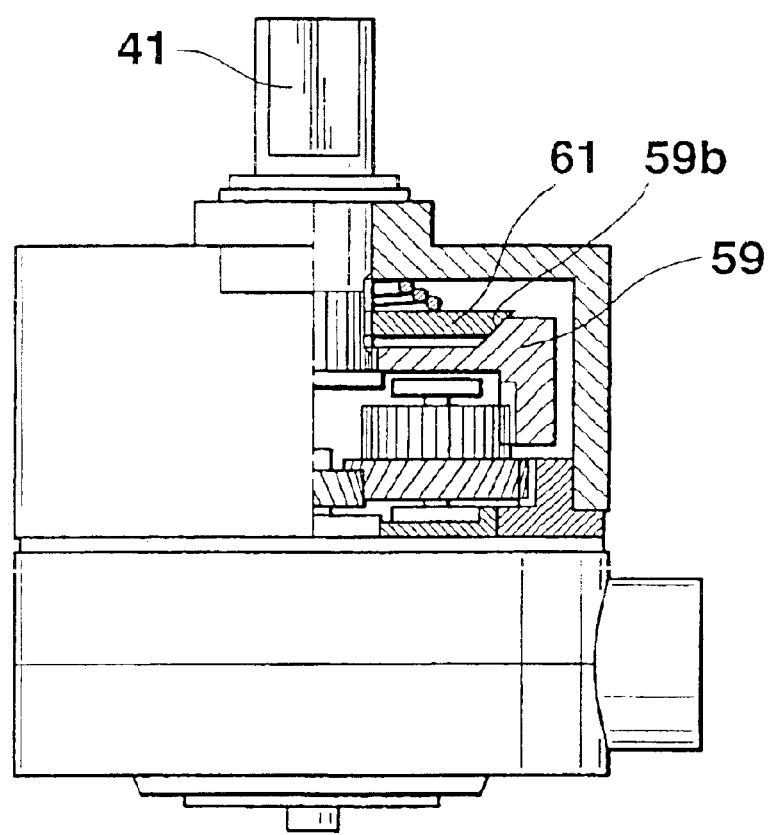
FIG. 4 is a partially cutaway side view showing a modification of the second embodiment.

As a modification of the torque limiting mechanism according to the second embodiment, in place of the bevel teeth 29b of the upper surface of the flange gear 29 and the bevel teeth 31a of the declutch gear 31, the torque limiting mechanism may be formed, as shown in FIG. 4, of a friction surface portion 59b formed on an upper surface of a flange gear 59, and a clutch disk 61 mounted to an output shaft 41 freely in the axial direction and fixedly in the rotational direction and adapted to come in frictional contact with the friction surface portion 59b normally.

What is claimed is:

1. A planetary gear reduction device with a torque limiter function comprising:

(a) a housing;

(b) an input shaft commonly served by an output shaft of a power source, rotatably supported by one end of said housing, located at a radially central and axially lower portion of said housing and adapted to take in a torque from the power source;

(c) an output shaft rotatably supported by the other end of said housing, located at a radially central and axially upper portion of said housing adapted to take out the torque transmitted from the power source;

(d) a reduction gear train provided between said input shaft and said output shaft and comprising a plurality of gears meshing with one another; and (e) a built-in torque limiting mechanism constituted in said reduction gear train, wherein said torque limiting mechanism comprises:

a flange gear mounted to said output shaft fixedly in an axial direction and freely in a circumferential direction;

an interal gear formed on an upper surface of said flange gear;

a declutch gear mounted to said output shaft freely in the axial direction and fixedly in the circumferential direction and adapted to mesh with said internal gear; and a compression means provided between an upper surface of said declutch gear and a lower surface of an upper lid of said housing and adapted to constantly press said declutch gear toward said internal gear, whereby when an excessive torque is generated in said output shaft, said declutch gear and said internal gear are disengaged from each other by a reaction force generated between respective teeth of those gears meshing with each other so as to disconnect torque transmission from said input shaft to said output shaft.

2. A device according to claim 1, wherein some of gears of said reduction gear train are helical gears.

3. A device according to claim 1, wherein said compression means is a conical compression spring.

4. A planetary gear reduction device with a torque limiter function, comprising:

a sun gear fixedly mounted to an input shaft rotatably supported and located at a radially central and axially lower portion of a housing;

at least one first planetary gear meshing with said sun gear through respective teeth formed on their respective outer circumferential surfaces;

a stationary ring gear having inner teeth and meshing with said first planetary gear through the inner teeth thereof;

at least one second planetary gear coaxially and integrally mounted on said first planetary gear to constitute at least one planetary gear pair;

an output shaft rotatably supported and located at a radially central and axially upper portion of said housing;

a flange gear mounted to said output shaft fixedly in an axial direction and freely in a circumferential direction and meshing with said second planetary gear through inner teeth formed on a lower portion of an inner circumferential surface thereof;

an internal gear formed on an upper surface of said flange gear;

a declutch gear mounted to said output shaft freely in the axial direction and fixedly in the circumferential direction and adapted to mesh with said internal gear; and means provided between an upper surface of said declutch gear and a lower surface of an upper lid of said housing and adapted to constantly press said declutch gear toward said internal gear, whereby when an excessive torque is generated in said output shaft, said declutch gear and said internal gear are disengaged from each other by a reaction force generated between respective teeth of those gears meshing with each other so as to disconnect torque transmission therebetween.

5. A device according to claim 4, wherein said sun gear, said first planetary gear, and said ring gear are helical gears.

6. A device according to claim 4, wherein said means for pressing is a conical compression spring.

7. A device according to claim 4, wherein a plurality of planetary gear pairs are provided along an inner circumferential surface of said ring gear.

* * * * *